United States Patent
Flanders

(10) Patent No.: US 8,072,343 B2
(45) Date of Patent: Dec. 6, 2011

(54) LOCAL EMERGENCY ISOLATION VALVE CONTROLLER WITH DIAGNOSTIC TESTING AND TROUBLE INDICATOR

(75) Inventor: Patrick S. Flanders, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 459 days.

(21) Appl. No.: 12/290,256

(22) Filed: Oct. 28, 2008

(65) Prior Publication Data

US 2009/0121868 A1    May 14, 2009

Related U.S. Application Data

(63) Continuation-in-part of application No. 11/095,416, filed on Mar. 31, 2005, now Pat. No. 7,504,961.

(51) Int. Cl.
*G08B 21/00*    (2006.01)
(52) U.S. Cl. ...... 340/679; 137/551; 137/552; 137/487.5; 137/624.12; 73/168; 73/862.325; 340/605
(58) Field of Classification Search ............... 340/605, 340/679; 137/551, 552, 487.5, 624.12, 486, 137/487, 488; 73/168
See application file for complete search history.

(56) References Cited

U.S. PATENT DOCUMENTS

| | | |
|---|---|---|
| 302,908 A | 8/1884 | Buell |
| 4,976,144 A | 12/1990 | Fitzgerald |
| 5,056,092 A | 10/1991 | Bruner |
| 5,197,328 A | 3/1993 | Fitzgerald |
| 5,329,465 A | 7/1994 | Arcella et al. |
| 5,425,316 A | 6/1995 | Malone |
| 5,573,032 A | 11/1996 | Lenz et al. |
| 5,586,050 A | 12/1996 | Makel et al. |
| 5,616,829 A | 4/1997 | Balaschak et al. |
| 5,646,600 A | 7/1997 | Abdel-Malek et al. |
| 5,684,451 A | 11/1997 | Seberger et al. |
| 6,057,771 A | 5/2000 | Lakra |
| 6,089,269 A | 7/2000 | Essam |
| 6,131,609 A | 10/2000 | Metso et al. |
| 6,176,247 B1 | 1/2001 | Winchcomb et al. |
| 6,186,167 B1 | 2/2001 | Grumstrup et al. |
| 6,283,138 B1 | 9/2001 | Friend et al. |
| 6,304,934 B1 | 10/2001 | Pimenta et al. |
| 6,435,022 B1 | 8/2002 | Albuaijan |

(Continued)

OTHER PUBLICATIONS

ISR & Written Opinion, PCT/US 09/05637, mailing date Dec. 4, 2009.

(Continued)

*Primary Examiner* — Brent Swarthout
(74) *Attorney, Agent, or Firm* — Abelman, Frayne & Schwab

(57) ABSTRACT

A local logic solver that operates with a local smart valve controller to control, test and monitor performance characteristics of a local field-mounted emergency isolation valve device, outputting a local indication of trouble on the device, which is mounted in the field away from the facility's central control panel for the process. The local logic solver includes a recording function and memory for retrieval of detected faults that are time-stamped and recorded locally to generate documentation and to track the elapsed time, starting when the degraded state of the device was detected and first signaled as a problem; other performance data is also recorded. Accordingly, the operation of the overall system is simplified by eliminating the need for an external computer to diagnose any problems. A local control panel preferably includes push-buttons and lights used during routine operations of the valve and a fault indicator light substantially adjacent to or in close proximity to the device being monitored to alert personnel of detected faults.

12 Claims, 2 Drawing Sheets

U.S. PATENT DOCUMENTS

| | | |
|---|---|---|
| 6,631,882 B2 | 10/2003 | Mack |
| 6,678,584 B2 | 1/2004 | Junk et al. |
| 6,862,547 B2 | 3/2005 | Snowbarger et al. |
| 7,079,021 B2 | 7/2006 | Snowbarger et al. |
| 2002/0069916 A1 | 6/2002 | Ferguson et al. |
| 2002/0108436 A1 | 8/2002 | Albuaijan |
| 2003/0034469 A1 | 2/2003 | Mack |
| 2004/0199351 A1 | 10/2004 | Ott et al. |
| 2005/0222772 A1 | 10/2005 | Koederitz |
| 2006/0220844 A1 | 10/2006 | Flanders |
| 2006/0272710 A1 | 12/2006 | Minervini |

OTHER PUBLICATIONS

U.S. Chemical Safety and Hazard Investigation Board, "Investigation Report: LPG Fire at Valero-McKee Refinery" (Jul. 2008).

LOCAL EMERGENCY ISOLATION VALVE CONTROLLER WITH DIAGNOSTIC TESTING AND TROUBLE INDICATOR

CROSS-REFERENCES TO RELATED APPLICATIONS

The present invention is a continuation-in-part of "Emergency Isolation Valve Controller With Integral Fault Indicator," U.S. application Ser. No. 11/095,416, filed Mar. 31, 2005, now U.S. Pat. No. 7,504,961, the entire contents of the which is herein incorporated by reference.

FIELD OF THE INVENTION

This invention relates to valve controllers, and in particular to a smart valve system for an emergency isolation valve (EIV). The valve controller may be used with pneumatic, hydraulic, or electrically-operated EIVs.

BACKGROUND OF THE INVENTION

Known smart valve systems and remote logic solvers can be connected to a plant-wide central monitoring computer, but such a configuration requires significant overhead in communication links among the distributed mechanisms, such as safety devices, in a process plant. Such overhead is compounded because smart valve controllers and local safety logic solvers can be separate entities each used for controlling a particular EIV.

Prior art smart valve systems include an assembly of an EIV, an actuator, a solenoid valve, a smart valve controller, a local control panel, and a plant-wide Emergency Shutdown (ESD) system. Each smart valve system uses the smart valve controller to control the travel of the EIV during routine functional testing, but relies heavily on the hard-wired input/output channels of a plant-wide ESD system for the logic required to enable local control through local control panels of individual smart valve devices and EIVs in the field.

Although some degree of local control of a safety instrumented function is provided by prior art systems, implementations of local control throughout a plant-wide ESD system have been very costly.

A need exists for integration of the logic required to perform local controls involved with a safety instrumented function for each EIV within a smart valve controller to reduce the overall ESD input/output (I/O) requirements and to provide a significant cost savings while implementing enhanced fault monitoring and detection.

Prior art implementations of a set of local control actions for each EIV to complete safety instrumented functions for each specific application have been costly.

In addition, many systems are available in the prior art which monitor devices in the field and which provide diagnostic alarms upon detection of problems of such field-based devices. However, such known systems require auxiliary computers to provide such monitoring and diagnostic functionality. In addition, operators or maintenance technicians must use a stand-alone computer with special diagnostic software to interpret the data collected during an EIV functional test and the associated test diagnostics.

Further, safety valve products in the prior art provide diagnostics remotely, but such products used in commercial processes and systems fail to provide a local indicator, mounted to devices in the field, for performing such monitoring and diagnostic functions.

A need exists for a device which simplifies operations for process plant operators and maintenance personnel by monitoring EIVs and their associated EIV control systems internally, as well as providing a local indicator of a detected fault at the time of detection, and recording valve performance data for later retrieval.

A problem with known monitoring systems of the prior art is the overload of alarms; that is, too many alarms of numerous monitoring devices in a monitoring system create human alert fatigue, which can pose a significant problem when a few serious hazardous conditions having alert indications are buried among alert indications of less serious issues.

A need exists for a straight-forward indication to personnel of problems in a plant which personnel can readily recognize as serious in order to take immediate action.

Known safety products and devices monitoring faults can track the occurrence of faults, but none provide a timeclock to track and record faults and other performance data locally, i.e., at the safety device. Accordingly, delays in transmission of clocked faults reduce the accuracy of the tracking of faults. A need exists for a locally-positioned clock to track and record detected faults and other performance data.

Known monitoring and detection systems provide limited alarm and warning capabilities. For example, U.S. Pat. No. 302,980 to Buell describes a fire extinguisher and alarm system using both local and remote central station alarm indications, but does not utilize or test EIVs using smart valve controllers.

U.S. Pat. Nos. 4,976,144 and 5,197,328 to Fitzgerald describe a diagnostic controller for testing and determining the operating condition of a pneumatically operated valve. However, the diagnostic controllers in Fitzgerald stroke a valve fully and so interrupts normal operations, and the diagnostic controller requires a portable external computer to be connected to pneumatic lines to collect data during testing.

U.S. Pat. No. 5,056,092 to Bruner describes a computer system monitor and controller using both local and remote central station alarm indications, for the purpose of entirely powering down another computer system, as opposed to testing an EIV.

U.S. Pat. No. 5,329,465 to Arcella et al. describes an on-line valve monitoring system which relies on a remotely located expert system to analyze valve data and to track and find trends in the historical data, as opposed to a local diagnostic and indicator system.

U.S. Pat. No. 5,425,316 to Malone describes a control system used in a waste disposal system which has sensors for measuring conditions throughout the waste disposal system in order to improve the efficiency of waste incineration combustion chambers, as opposed to testing EIVs.

U.S. Pat. No. 5,573,032 to Lenz et al. describes a valve positioner with pressure feedback and other diagnostic functions, but the valve positioner lacks internal diagnostics and so there cannot be any local indication of detected faults.

U.S. Pat. No. 5,586,050 to Makel et al. describes a remotely controllable management system for a liquefied natural gas (LNG) station using both local and remote central station alarm indications. However, the management system relies on a remotely located host computer for emergency warnings and shut-down features. The management system does not relate to EIVs and does not provide local fault indications based on internal diagnostics.

U.S. Pat. No. 5,684,451 to Seberger et al. describes a control system for digital communications with an instrument to perform diagnostic operations for use with an electro-pneumatic valve positioner, as opposed to performing safety related EIV on-board diagnostics and local indications of detected failures.

U.S. Pat. No. 6,089,269 to Essam describes an emergency valve connected to a partial stroke controller to perform a partial stroke test at a predetermined time, but fails to provide any on-board diagnostics and any location indication of detected failures.

U.S. Pat. No. 6,131,609 to Metso et al. describes a method and apparatus for surveying the condition of a control valve using on-board sensors, with diagnostics programmed into a digital positioner of the control valve. However, when faults are detected, such detection is communicated to a remote control system in a monitoring room in a separate control building, as opposed to a local indication of the detection of the faults.

U.S. Pat. No. 6,176,247 B1 to Winchcomb et al. describes a device for verifying the workability of a safety device, using on-board diagnostics of a safety related final element such as an EIV, and detected faults are communicated to a Remote Communications Interface (RCI), as opposed to the local indication of a fault.

U.S. Pat. No. 6,283,138 B1 to Friend et al. describes a pressure relief valve monitoring device using both local and remote central station alarm indications to detect faults in pressure relief valves, as opposed to EIVs.

U.S. Pat. No. 6,435,022 B1 to Albuaijan, based on U.S. Patent Application Publication Number US 2002/0108436 A1 to Albuaijan, describes a partial stroke testing system using a limit switch invention to control the travel of a valve during on-line testing, but lacks on-board diagnostics and local indication of detected failures.

U.S. Pat. No. 6,631,882 B2 to Mack describes a testing apparatus to test a shutdown device during operation of a process, but requires use of a remotely located programmable logic controller to perform the testing and alarm functions on detection of test failure conditions. No on-board self-diagnostics are provided, and there is no local indication of a detected fault.

U.S. Pat. No. 6,678,584 to Junk et al. describes a method and apparatus for performing diagnostics in a pneumatic control loop for a control valve, but lacks any provision of a local indication of detected dangerous faults.

SUMMARY OF THE INVENTION

The present invention expands the capabilities of smart valve controllers to include logic and local interface capabilities required to perform a safety instrumented function associated with an emergency isolation valve within the smart valve controller, and to incorporate a timeclock and recording capability to record faults and other valve performance data.

The present invention includes a local logic solver operating with a local smart valve controller to control and test a local field-mounted emergency isolation (or interrupt) valve (EIV) which provides an indication of trouble locally (at the field device). Accordingly, the operation of the overall system is simpler, in that there is no longer a need to use an external computer to diagnose the problem. In addition, technicians and operators in the field are alerted to a serious problem locally to perform any necessary safety precautions, and allowing a specialist to further diagnose the problem.

In addition, the present invention provides an indicator light which has a steady ON state when the valve being monitored is healthy during normal operations, and which changes to a flashing state when a fault is detected by internal diagnostics onboard the device itself. In addition, when the normally steady ON indicator light is in a steady OFF state, the illumination device such as a lamp of the indicator light has either burned out or the device being monitored is out of service.

Further, a common trouble indicator lamp will be activated upon the occurrence of a significant fault, such as a stuck valve, broken shaft, or a condition in which damage to the valve actuator would prevent the EIV from moving to a pre-defined fail-safe state.

The present invention can be applied to other monitoring devices, such as a Smart Solenoid valve which monitors different types of internal failures such as a significant differential pressure across valve ports, as well as hazardous coil temperatures.

The present invention monitors and indicates only dangerous, normally undetected failures which would disable the intended safety functions, with such monitoring and indication being provided with a local indicator to personnel in the field.

In addition, the present invention is useful for tracking faults and for verifying safety system performance. Since a plant process is required to have its safety systems checked and maintained routinely to ensure proper functioning at the level of performance required to meet, for example, the original plant safety guidelines, the present invention helps perform the required documentation of system performance. When a dangerous fault in a safety device is detected, an internal clock will time stamp the detected fault, and the time stamping will continue until the fault is cleared. In this way, the time that the safety device was operating in a disabled state can be tracked and documented so that the impact on the overall safety instrumented systems performance can be more accurately evaluated. Furthermore, the running clock and time stamping feature of the present invention is performed locally. The time clock is also used to track and record valve performance data such as the date and time at which: a fault is detected, the fault is cleared, a stroke test is initiated, the stroke test pass or fail result is attained, a safety system demand is issued, or a nuisance trip occurs. The local logic solver can also record valve travel vs. time during a safety system demand or during a nuisance trip, and can record the result of functional testing.

BRIEF DESCRIPTION OF THE DRAWINGS

Preferred embodiments of the invention are described hereinbelow with reference to the drawings wherein.

DETAILED DESCRIPTION OF THE INVENTION

Figure 1:
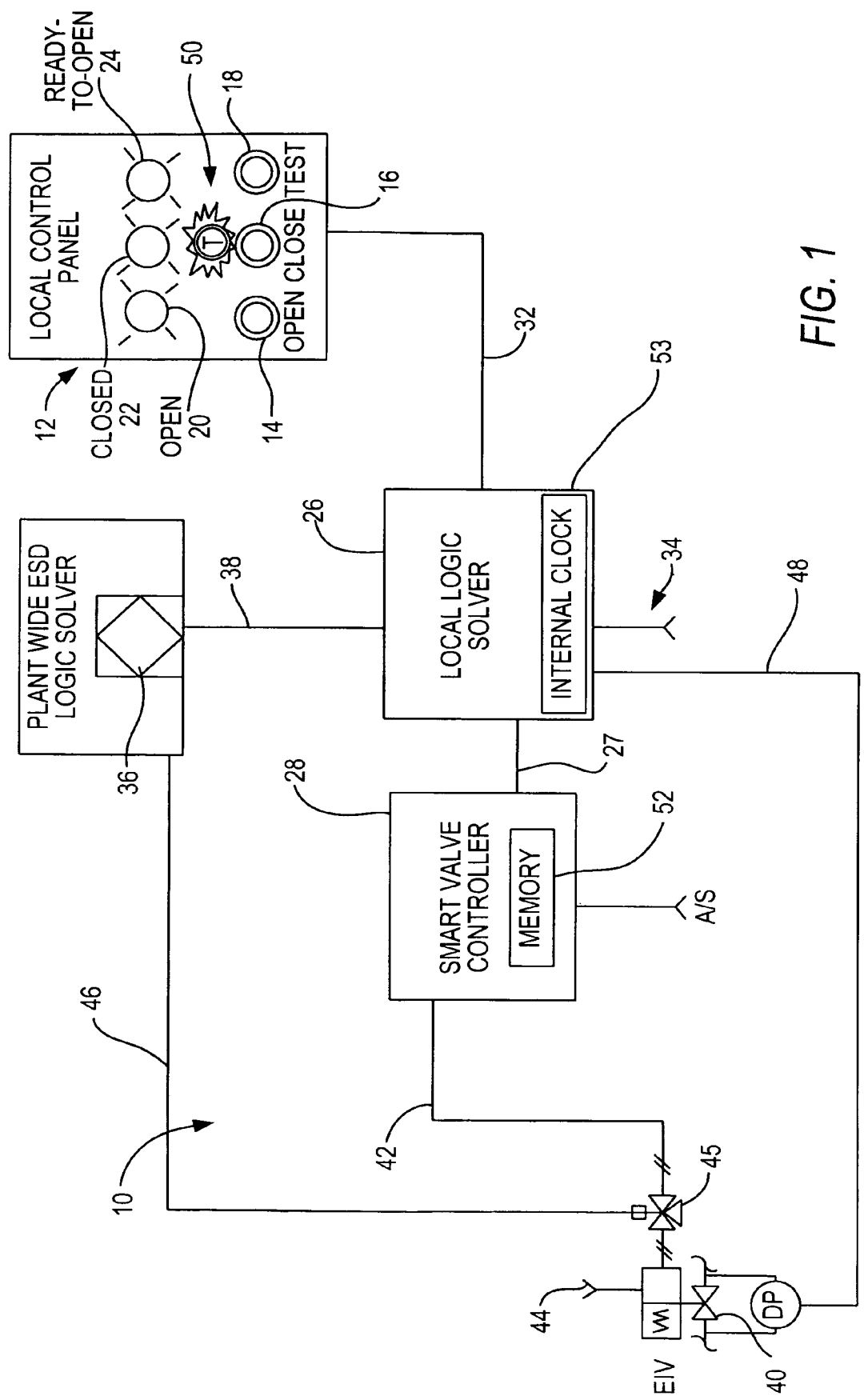
FIG. 1 illustrates a schematic block diagram of the system in accordance with the present invention.
Figure 2:
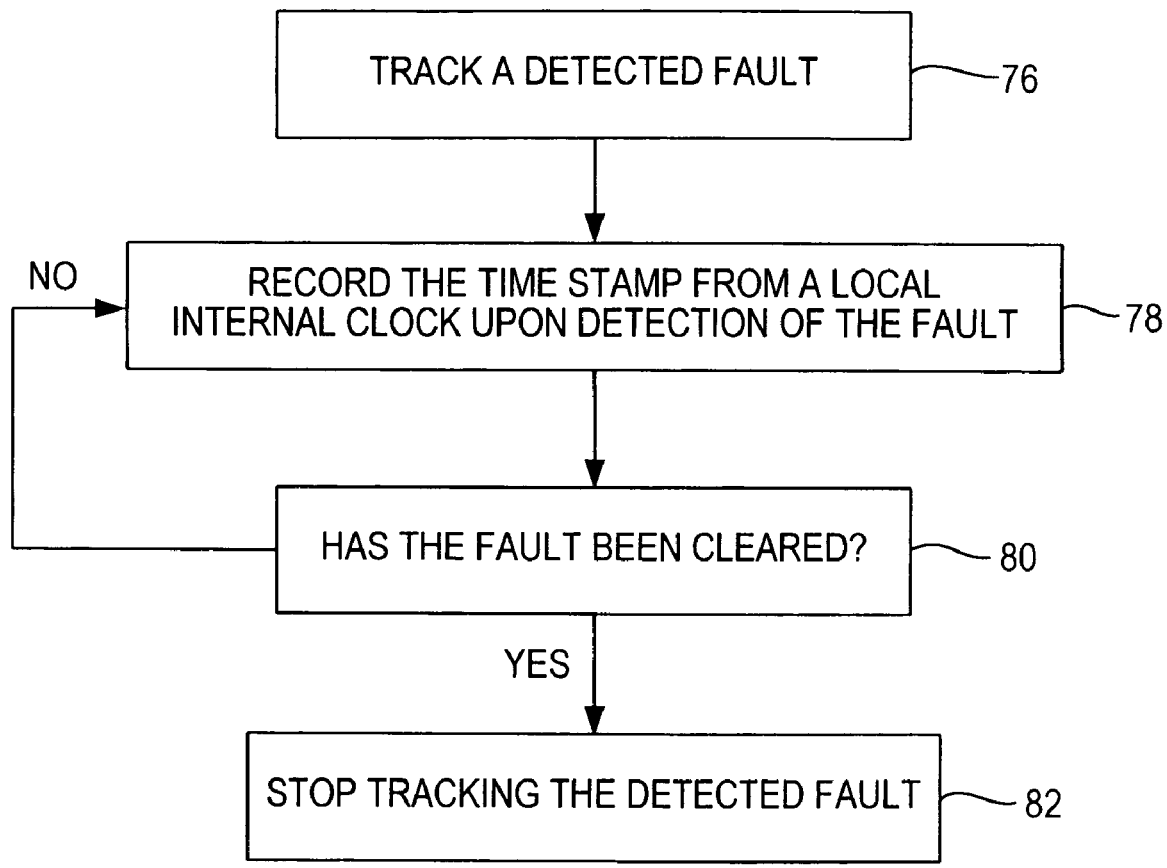
FIG. 2 illustrates a flowchart of the process for tracking detected faults.

As illustrated in FIGS. 1 and 2, the present invention is a system and method for managing plant processes which include enhanced function indicators and logic and local interface capabilities in a smart valve controller, such that a monitoring system of a process plant is capable of performing safety instrumented functions (SIF) with an emergency isolation valve (EIV) within the smart valve controller itself, and so the overhead or footprint of data communications and processing of the plant-wide ESD is reduced, and diagnostic coverage of each EIV as final elements is increased through improved testing features.

The smart valve controller can be implemented in a known manner, for example, to provide the apparatus described in U.S. Pat. No. 6,186,167 and U.S. Patent Application publication no. US 20030062494 A1, each of which is incorporated by reference in its entirety.

Such an implementation of the integrated function indicator and smart controller reduces the plant-wide emergency shutdown system I/O required for each smart valve device, such as digital valve controllers with emergency shutdown (ESD) valves. The present invention takes advantage of the emerging Foundation Fieldbus for Safety Instrumented Systems (FF-SIS) communications protocol to increase the flow of diagnostic information from the field device to the plant-wide ESD system, as well as to provide a secure communications link to allow the final elements or EIVs to communicate directly with the ESD host system.

As shown FIG. 1, the system 10 of the present invention provides a local control panel (LCP) 12 which houses a plurality of controls, such as a VALVE OPEN pushbutton 14, a VALVE CLOSE pushbutton 16, a VALVE TEST pushbutton 18, a VALVE OPEN indicator light 20, a VALVE CLOSED indicator light 22, and a READY-TO-OPEN indicator light 24. In the present invention, the LCP 12 directly interfaces with a local logic solver 26 connected to a smart valve controller 28. The local logic solver 26 can include a combination of remote safety logic and a communication interface, with such remote safety logic being remote relative to a plant control center. The local logic solver 26 can be housed in a separate enclosure, as shown, or can be housed within an enclosure also housing either the LCP 12 or the smart valve controller 28.

The LCP 12 is positioned substantially adjacent to the local logic solver 26 and connected by a transmission channel 32, such as a wired and/or wireless connection, for conveying discrete signals required for local control and testing. The local logic solver 26, in turn, is positioned substantially adjacent to the smart valve controller 28 and connected by a transmission channel 27, such as a wired and/or wireless connection, for conveying discrete signals required for local control and testing.

The local logic solver 26 is provided with power from a power supply 34, such as a 24 VDC supply, which can be independent of the plant-wide power grid. The local logic solver 26 can be connected to the plant-wide ESD logic solver 36 by a communications link 38, which can comply with the FF-SIS communications protocol standard to provide global ESD plant-wide trips and permissives to the local logic solver 26.

Instead of relying on a plant-wide ESD system and its logic solver 36 as in the prior art to control such local control functions, the smart valve controller 28 and local logic solver 26 jointly serve as a local safety instrumented function logic solver for a specific EIV 40.

The smart valve controller 28 has a controller pneumatic output 42 to the EIV actuator 44 of the EIV 40. Alternatively, the valve controller could be used with hydraulic or electrically-operated EIVs. Signals from the EIV actuator 44 including a differential pressure (DP) transmitter permissive 48 are transmitted to the local logic solver 26. The differential pressure (DP) transmitter permissive 48 prevents opening the EIV 40 until pressure across the EIV 40 has been equalized. An ESD solenoid valve 45 can be added, with a discrete interface 46 to the Plant-Wide ESD system. The discrete interface 46 can be used in conjunction with a one-out-of-two voting with smart valve positioner, as required to meet the safety function risk reduction requirements.

The local logic solver 26 can be a scalable programmable ESD logic solver which can be connected to known smart valve controllers, so there is no need for modification of known smart valve controllers for implementation as the controller 28.

The present invention distributes the control of each EIV 40 from the plant-wide ESD system to each individual smart valve controller 28 and local logic solver 26 configured specifically for the required safety instrumented function associated with the respective EIV 40.

In addition, the present invention provides a local valve test diagnostic indicator, in the form of a trouble light 50 and/or other audio or visual devices, at the LCP 12. The valve test diagnostic software within the local logic solver 26 utilizes the data collected within an on-board memory 52 of the smart valve controller 28 during an on-line functional test. The valve test diagnostic indicator 50 compares the collected data of the on-line functional test with data collected during a previous on-line functional test stored in the memory 52. Upon a predefined significant change in data values between tests, the valve test diagnostic activates an alarm at the LCP 12 via the trouble light 50. Such significant changes can include an excessive travel deviation, a pneumatic systems check, or other functional parameters of the smart valve controller 26.

The trouble light 50 is mounted on the LCP 12 to be clearly visible to alert an operator to a problem detected when the testing is conducted. Accordingly, the operator is allowed to take corrective action immediately without the need to connect a diagnostic computer to the smart valve controller 26 and to spend time analyzing test results. The use of the trouble light 50 provides a user-friendly indicator that takes advantage of the inherent diagnostic capabilities available in known smart controllers.

In addition, the prevent invention provides a common platform for local valve control using safety instrumented system (SIS) logic as a standardized communications protocol, as well as for valve travel monitoring, valve testing and data collection, and diagnostic alarms and alerts.

In operation, the present invention expands the capabilities of smart valve controllers to include logic and local interface capabilities required to perform a safety instrumented function associated with an emergency isolation valve within the smart valve controller. The use of the present invention reduces the complexity of the plant-wide emergency shutdown system I/O connections required for each smart valve, through the integration of a dedicated Local Control Panel.

The present invention provides a local indication of trouble on the smart valve 40, which is mounted in the field away from the process facility. Accordingly, the operation of the overall system is simpler, in that there is no longer a need to use an external computer to diagnose the problem. In addition, technicians and operators in the field are alerted to a serious problem locally so that they can institute any necessary safety precautions, and alert a specialist to further diagnose the problem.

The present invention provides recording and memory functions that include a time-stamp program that is used to track and record valve performance data such as the date and time at which a fault is detected, the fault is cleared, a stroke test is initiated, pass or fail test results are attained, a safety system demand is issued, or a nuisance trip occurs. Flash RAM memory is used, keeping only critical information in memory. Oldest data is replaced with most recent data, as required. The system will be programmable with standards for acceptable performance characteristics, so that it may determine whether a valve passed or failed a stroke test.

The expanded recording and memory capabilities also provide for the retrieval of data relating to the recording of valve travel vs. time during a safety system demand or during a nuisance trip, and the recording of the result of EIV function testing. When retrieving the historic data, a laptop or auxiliary system will be required. Data can be transferred using standard digital methods, such as a serial I/O port.

The present invention can be applied to other monitoring devices, such as smart solenoid valves which monitor different types of internal failures such as a significant differential pressure across valve ports, as well as hazardous coil temperatures.

The present invention monitors and indicates dangerous, normally undetected failures which would disable the intended safety functions, with such monitoring and indication being provided with a local indicator alarm to personnel in the field. Another important aspect of the present invention is the recording and storage for retrieval in memory of valve performance data.

The systems and methods of the present invention ensure that the plant process safety systems are operating as required. As shown in FIG. 2, when a dangerous fault in a safety device is detected, the local logic solver 26 of the present invention tracks the detected fault in step 76 and records in associated memory a time stamp in step 78, using internal clock 53 of the local logic solver 26 to timestamp the detected fault. The method then tracks the fault in step 80 until it has been cleared, or loops back to step 78 if it has not been cleared. When the fault is cleared, the method proceeds to step 82 to stop tracking the detected fault. In this way, the time that the safety device 40 was operating in a disabled state is tracked and documented so that the impact on the overall performance of the safety instrumented system can be more accurately evaluated. Furthermore, the running clock and time-stamping feature of the present invention is performed locally by the local logic solver 26.

While preferred embodiments of the present invention have been illustrated and described herein, it will be obvious that such embodiments are provided by way of example only. Numerous variations, changes and substitutions will be apparent to those skilled in the art without departing from the invention herein. Accordingly, it is intended that the scope of the invention be determined by the following claims.

I claim:

1. A system for field monitoring an emergency isolation valve (EIV), the system comprising:
    a local smart valve controller for controlling, testing, and monitoring operation of the EIV and, optionally, an operatively associated actuator for the EIV;
    a local logic solver substantially adjacent to the EIV operatively connected to the local smart valve controller to perform the testing and monitoring of the operational characteristics of the EIV, and to record and store valve performance data for retrieval; and
    a local control panel including a trouble indicator light viewable by personnel in the vicinity of the local control panel, the trouble indicator light automatically activated upon the detection by the local logic solver of a fault of the EIV, the local smart valve controller, or an operatively associated actuator of the EIV, the local control panel being positioned substantially adjacent to the EIV and operably connected to the local logic solver for responding to the testing and monitoring of the EIV;
    wherein upon detection of an EIV stroke test, the valve performance data that is recorded by the local logic solver comprises the time when the stroke test was initiated and whether the EIV passed or failed the test.

2. The system of claim 1, in which the pass/fail test determination is based upon a comparison of data collected during the stroke test with data collected during a previous stroke test.

3. A system for field monitoring an emergency isolation valve (EIV), the system comprising:
    a local smart valve controller for controlling, testing, and monitoring operation of the EIV and, optionally, an operatively associated actuator for the EIV;
    a local logic solver substantially adjacent to the EIV operatively connected to the local smart valve controller to perform the testing and monitoring of the operational characteristics of the EIV, and to record and store valve performance data for retrieval; and
    a local control panel including a trouble indicator light viewable by personnel in the vicinity of the local control panel, the trouble indicator light automatically activated upon the detection by the local logic solver of a fault of the EIV, the local smart valve controller, or an operatively associated actuator of the EIV, the local control panel being positioned substantially adjacent to the EIV and operably connected to the local logic solver for responding to the testing and monitoring of the EIV;
    wherein upon detection of a demand signal for the EIV to move to the fail-safe position, the valve performance data that is recorded by the local logic solver includes the time of the receipt of the transmission of the demand signal.

4. A system for field monitoring an emergency isolation valve (EIV), the system comprising:
    a local smart valve controller for controlling, testing, and monitoring operation of the EIV and, optionally, an operatively associated actuator for the EIV;
    a local logic solver substantially adjacent to the EIV operatively connected to the local smart valve controller to perform the testing and monitoring of the operational characteristics of the EIV, and to record and store valve performance data for retrieval; and
    a local control panel including a trouble indicator light viewable by personnel in the vicinity of the local control panel, the trouble indicator light automatically activated upon the detection by the local logic solver of a fault of the EIV, the local smart valve controller, or an operatively associated actuator of the EIV, the local control panel being positioned substantially adjacent to the EIV and operably connected to the local logic solver for responding to the testing and monitoring of the EIV;
    wherein upon detection of a demand signal for the EIV to move to the fail-safe position, the valve performance data that is recorded by the local logic solver comprises the valve travel percentage over time.

5. A system for field monitoring an emergency isolation valve (EIV), the system comprising:
    a local smart valve controller for controlling, testing, and monitoring operation of the EIV and, optionally, an operatively associated actuator for the EIV;
    a local logic solver substantially adjacent to the EIV operatively connected to the local smart valve controller to perform the testing and monitoring of the operational characteristics of the EIV, and to record and store valve performance data for retrieval; and
    a local control panel including a trouble indicator light viewable by personnel in the vicinity of the local control panel, the trouble indicator light automatically activated upon the detection by the local logic solver of a fault of the EIV, the local smart valve controller, or an operatively associated actuator of the EIV, the local control panel being positioned substantially adjacent to the EIV and operably connected to the local logic solver for responding to the testing and monitoring of the EIV;

wherein upon detection of a nuisance trip of the EIV, the valve performance data that is recorded by the local logic solver comprises the time of the beginning of the nuisance trip.

6. A system for field monitoring an emergency isolation valve (EIV), the system comprising:
   a local smart valve controller for controlling, testing, and monitoring operation of the EIV and, optionally, an operatively associated actuator for the EIV;
   a local logic solver substantially adjacent to the EIV operatively connected to the local smart valve controller to perform the testing and monitoring of the operational characteristics of the EIV, and to record and store valve performance data for retrieval; and
   a local control panel including a trouble indicator light viewable by personnel in the vicinity of the local control panel, the trouble indicator light automatically activated upon the detection by the local logic solver of a fault of the EIV, the local smart valve controller, or an operatively associated actuator of the EIV, the local control panel being positioned substantially adjacent to the EIV and operably connected to the local logic solver for responding to the testing and monitoring of the EIV;
   wherein upon detection of a nuisance trip of the EIV, the valve performance data that is recorded by the local logic solver comprises the valve travel percentage over time.

7. A method for the field monitoring of an emergency isolation valve (EIV) comprising the steps of:
   managing operation of the EIV using a local smart valve controller;
   positioning a local logic solver substantially adjacent to the EIV and operatively connected to the smart valve controller;
   positioning a local control panel having local operator pushbuttons and indicators including a trouble indicator light substantially adjacent to the EIV and in the field of view of personnel in the vicinity of the local control panel;
   operatively connecting the local control panel to the local logic solver;
   controlling the activation of the trouble indicator light in response to testing and monitoring conditions of the EIV, comprising activating the trouble indicator light upon automatic detection by the local logic solver of a fault in the performance of the EIV, the local smart valve controller, or an operatively associated actuator of the EIV; and
   operating the local logic solver to perform testing and monitoring of operational characteristics of the EIV and to record and store for retrieval data relating to valve performance;
   wherein upon detection of a partial or full stroke test of the EIV, the step of recording valve performance data comprises the steps of:
   recording the time when the partial stroke test was initiated; and
   recording whether the EIV passed or failed the test.

8. The method of claim 7, in which the pass/fail test determination is based upon a comparison of data collected during the stroke test with data collected during a previous stroke test.

9. A method for the field monitoring of an emergency isolation valve (EIV) comprising the steps of:
   managing operation of the EIV using a local smart valve controller;
   positioning a local logic solver substantially adjacent to the EIV and operatively connected to the smart valve controller;
   positioning a local control panel having local operator pushbuttons and indicators including a trouble indicator light substantially adjacent to the EIV and in the field of view of personnel in the vicinity of the local control panel;
   operatively connecting the local control panel to the local logic solver;
   controlling the activation of the trouble indicator light in response to testing and monitoring conditions of the EIV, comprising activating the trouble indicator light upon automatic detection by the local logic solver of a fault in the performance of the EIV, the local smart valve controller, or an operatively associated actuator of the EIV; and
   operating the local logic solver to perform testing and monitoring of operational characteristics of the EIV and to record and store for retrieval data relating to valve performance;
   wherein upon detection of a demand signal for the EIV to move to the fail-safe position, the step of recording valve performance data comprises the step of recording the time of the transmission of the demand signal.

10. A method for the field monitoring of an emergency isolation valve (EIV) comprising the steps of:
    managing operation of the EIV using a local smart valve controller;
    positioning a local logic solver substantially adjacent to the EIV and operatively connected to the smart valve controller;
    positioning a local control panel having local operator pushbuttons and indicators including a trouble indicator light substantially adjacent to the EIV and in the field of view of personnel in the vicinity of the local control panel;
    operatively connecting the local control panel to the local logic solver;
    controlling the activation of the trouble indicator light in response to testing and monitoring conditions of the EIV, comprising activating the trouble indicator light upon automatic detection by the local logic solver of a fault in the performance of the EIV, the local smart valve controller, or an operatively associated actuator of the EIV; and
    operating the local logic solver to perform testing and monitoring of operational characteristics of the EIV and to record and store for retrieval data relating to valve performance, performance;
    wherein upon detection of a demand signal for the EIV to move to the fail-safe position, the step of recording valve performance data comprises the step of recording the valve travel percentage over time.

11. A method for the field monitoring of an emergency isolation valve (EIV) comprising the steps of:
    managing operation of the EIV using a local smart valve controller;
    positioning a local logic solver substantially adjacent to the EIV and operatively connected to the smart valve controller;
    positioning a local control panel having local operator pushbuttons and indicators including a trouble indicator light substantially adjacent to the EIV and in the field of view of personnel in the vicinity of the local control panel;

operatively connecting the local control panel to the local logic solver;

controlling the activation of the trouble indicator light in response to testing and monitoring conditions of the EIV, comprising activating the trouble indicator light upon automatic detection by the local logic solver of a fault in the performance of the EIV, the local smart valve controller, or an operatively associated actuator of the EIV; and operating the local logic solver to perform testing and monitoring of operational characteristics of the EIV and to record and store for retrieval data relating to valve performance, performance;

wherein upon detection of a nuisance trip of the EIV, the step of recording valve performance data comprises the step of recording the time of the beginning of the nuisance trip.

12. A method for the field monitoring of an emergency isolation valve (EIV) comprising the steps of:

managing operation of the EIV using a local smart valve controller;

positioning a local logic solver substantially adjacent to the EIV and operatively connected to the smart valve controller;

positioning a local control panel having local operator pushbuttons and indicators including a trouble indicator light substantially adjacent to the EIV and in the field of view of personnel in the vicinity of the local control panel;

operatively connecting the local control panel to the local logic solver;

controlling the activation of the trouble indicator light in response to testing and monitoring conditions of the EIV, comprising activating the trouble indicator light upon automatic detection by the local logic solver of a fault in the performance of the EIV, the local smart valve controller, or an operatively associated actuator of the EIV; and operating the local logic solver to perform testing and monitoring of operational characteristics of the EIV and to record and store for retrieval data relating to valve performance;

wherein upon detection of a nuisance trip of the EIV, the step of recording valve performance data comprises the step of recording the valve travel percentage over time.

* * * * *